United States Patent
Park (10) Patent No.: US 11,124,126 B2
(45) Date of Patent: Sep. 21, 2021

(54) GLOVE BOX APPARATUS

(71) Applicant: HYUNDAI MOBIS CO., LTD., Seoul (KR)

(72) Inventor: Jae Whoan Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 6 days.

(21) Appl. No.: 16/855,248

(22) Filed: Apr. 22, 2020

(65) Prior Publication Data

US 2020/0331402 A1 Oct. 22, 2020

(30) Foreign Application Priority Data

Apr. 22, 2019 (KR) .................. 10-2019-0046724

(51) Int. Cl.
*B60R 7/06* (2006.01)
*E05D 15/58* (2006.01)

(52) U.S. Cl.
CPC .............. *B60R 7/06* (2013.01); *E05D 15/582* (2013.01); *E05D 2015/586* (2013.01); *E05Y 2900/538* (2013.01)

(58) Field of Classification Search
CPC ..... B60R 7/06; E05B 83/30; E05Y 2900/538; E05D 15/582; E05D 2015/586
USPC ..................................................... 296/37.12
See application file for complete search history.

(56) References Cited

U.S. PATENT DOCUMENTS

| | | | | |
|---|---|---|---|---|
| 4,995,680 | A * | 2/1991 | Miruri | B60R 11/0205 312/7.1 |
| 5,184,489 | A * | 2/1993 | Squires | B60R 11/0205 296/37.12 |
| 5,460,309 | A * | 10/1995 | Nehl | B60R 7/082 224/281 |
| 7,185,927 | B2 * | 3/2007 | Talukdar | E05B 83/30 292/124 |
| 7,374,220 | B2 * | 5/2008 | Ichimaru | B60R 7/06 296/24.34 |
| 8,459,603 | B2 * | 6/2013 | Baudisch | B60K 35/00 248/292.14 |
| 9,216,696 | B2 * | 12/2015 | Zhong | B60R 7/06 |
| 2002/0101091 | A1 * | 8/2002 | Ito | B60R 11/0264 296/37.12 |

(Continued)

FOREIGN PATENT DOCUMENTS

KR 10-2017-0095337 A 8/2017
KR 2020663010 A * 6/2020

*Primary Examiner* — Pinel E Romain
(74) *Attorney, Agent, or Firm* — Morgan, Lewis & Bockius LLP (57) ABSTRACT

A glove box apparatus includes a fixed unit fixed to a vehicle body; a housing unit positioned inside the fixed unit, and installed to be movable between an open mode in which a storage space is open and a closing mode in which the storage space is closed; a driving unit installed on the fixed unit, and configured to supply power for moving the housing unit; a movable bracket unit linearly moved by receiving the power of the driving unit, and having the housing unit rotatably installed thereon; a fixed guide unit fixed to the fixed unit which faces the movable bracket unit, and defined with a guide slot; and a movable connection unit connected to the housing unit by passing through the guide slot of the fixed guide unit and the movable bracket unit.

9 Claims, 10 Drawing Sheets

(56) References Cited

U.S. PATENT DOCUMENTS

| | | | |
|---|---|---|---|
| 2012/0175204 A1* | 7/2012 | Arnold | E05F 5/00 188/271 |
| 2014/0175824 A1* | 6/2014 | Park | B60R 7/06 296/37.12 |
| 2015/0360616 A1* | 12/2015 | Shami | B60R 7/06 296/37.8 |
| 2019/0003215 A1* | 1/2019 | Stoia | E05B 81/56 |
| 2020/0002978 A1* | 1/2020 | Ketels | B60K 37/06 |

* cited by examiner

GLOVE BOX APPARATUS

CROSS-REFERENCE TO RELATED APPLICATION

This application claims priority from and the benefit of Korean Patent Application No. 10-2019-0046724, filed on Apr. 22, 2019, which is hereby incorporated by reference for all purposes as if set forth herein.

BACKGROUND

Field

Exemplary embodiments of the present disclosure relate to a glove box apparatus, and more particularly, to a glove box apparatus capable of minimizing a malfunction due to the deformation in each part when the opening and closing of a glove box is automatically performed.

Discussion of the Background

In general, a glove box is installed in a dashboard of a vehicle. Articles may be kept in the glove box, and the operation type of the glove box is generally divided into a rotational movement type and a translational movement type. In the case of the rotational movement type, the glove box is rotated about a lower side thereof to realize opening and closing operations. A current operation type of the glove box is mostly the rotational movement type. In the case of the translational movement type glove box, integral parts such as a cover and a housing are moved back and forth when the glove box is opened and closed, and in this way, opening and closing operations are realized.

In the case of the rotational movement type glove box, the glove box is opened as only a cover is rotated in a state in which a housing is fixed. Therefore, there is inconvenience in that, when taking out or receiving an article, a user needs to bend his/her waist down and put the hand in an invisible space inside the housing, and there is a problem in that it is difficult for the user to easily identify articles deep in the housing.

In the case of an electric glove box which is opened and closed by the operation of an actuator, as each part is likely to be deformed due to its own weight and thus friction occurs in opening and closing operations, a problem may be caused in that the opening and closing operations cannot be properly performed. Therefore, there is a need to solve such a problem.

A background art of the present disclosure is disclosed in Korean Patent Laid-open Publication No. 2017-0095337 (published on Aug. 22, 2017 and entitled "Motor Vehicle Glove Box").

SUMMARY

Various embodiments are directed to a glove box apparatus capable of minimizing a malfunction due to the deformation in each part when the opening and closing of a glove box is automatically performed.

In an embodiment, a glove box apparatus may include: a fixed unit fixed to a vehicle body; a housing unit positioned inside the fixed unit, and installed to be movable between an open mode in which a storage space is open and a closing mode in which the storage space is closed; a driving unit installed on the fixed unit, and configured to supply power for moving the housing unit; a movable bracket unit linearly moved by receiving the power of the driving unit, and having the housing unit rotatably installed thereon; a fixed guide unit fixed to the fixed unit which faces the movable bracket unit, and defined with a guide slot; and a movable connection unit connected to the housing unit by passing through the guide slot of the fixed guide unit and the movable bracket unit.

The movable bracket unit may include: a movable base part fixed to a lower side of the housing unit, and having a rack gear which receives the power of the driving unit; a side bracket extending upward from each of both sides of the movable base part; and a guide hole formed through the side bracket to define an aperture for allowing the movable connection unit to be moved therethrough.

The movable bracket unit may further include: a rotatable connection part configured to rotatably connect the side bracket and the housing unit.

The guide hole may be installed at a position facing the guide slot, and may extend as an elongated hole in a direction different from the guide slot.

The guide hole may form an elongated hole with a curved shape.

The fixed guide unit may include: a mounting base part fixed to the fixed unit; and a fixed bracket extending upward out of the mounting base part to face the side bracket, and having the guide slot formed therethrough.

The fixed guide unit may further include: a side slot formed through the fixed bracket, and defining an elongated aperture which extends in a direction different from the guide slot.

The glove box apparatus may further include: a side connection unit connected to the housing unit by passing through the side slot, and moved along the side slot by movement of the housing unit.

The side slot may have a shape of a hole which extends in a shape of a downwardly concaved curve.

In the glove box apparatus according to the embodiments of the disclosure, as a movable connection unit which is connected to a housing unit is moved along a guide slot and a guide hole, the translational movement and the rotational movement of the housing unit may be easily performed, and a malfunction due to the deformation in each part may be minimized.

Also, according to the embodiments of the disclosure, since the housing unit is configured to be rotated as well as translated toward a passenger when operating in an open mode, the storage space of a glove box may be secured even when the glove box apparatus is applied to a slimmed dashboard.

DETAILED DESCRIPTION OF THE ILLUSTRATED EMBODIMENTS

Hereinbelow, a glove box apparatus in accordance with an embodiment of the disclosure will be described with reference to attached drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the intention of users or operators or practice. Therefore, definition of the terms should be made according to the overall disclosures set forth herein.

Figure 1:
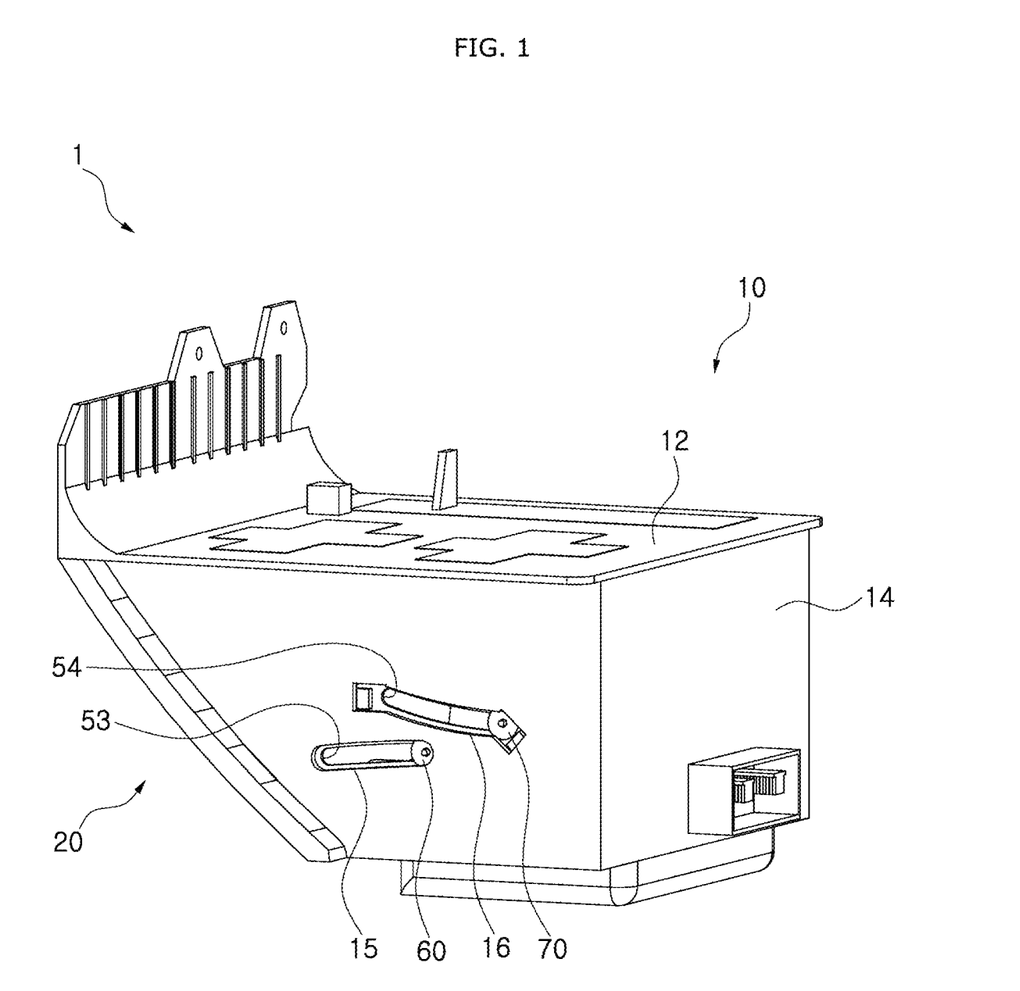
FIG. 1 is a perspective view illustrating a glove box apparatus in accordance with an embodiment of the disclosure.
Figure 2:
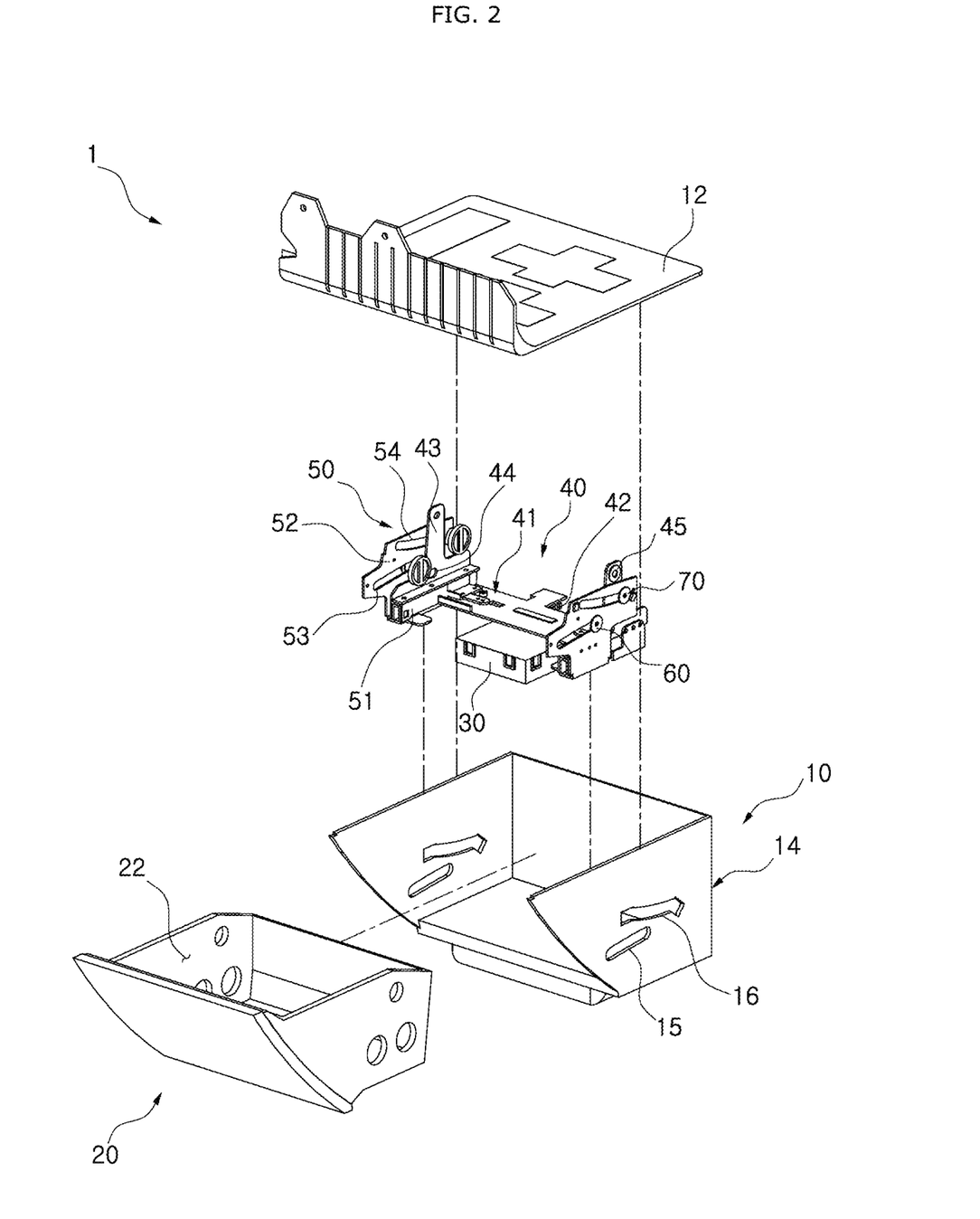
FIG. 2 is an exploded perspective view illustrating the glove box apparatus in accordance with the embodiment of the disclosure.
Figure 3:
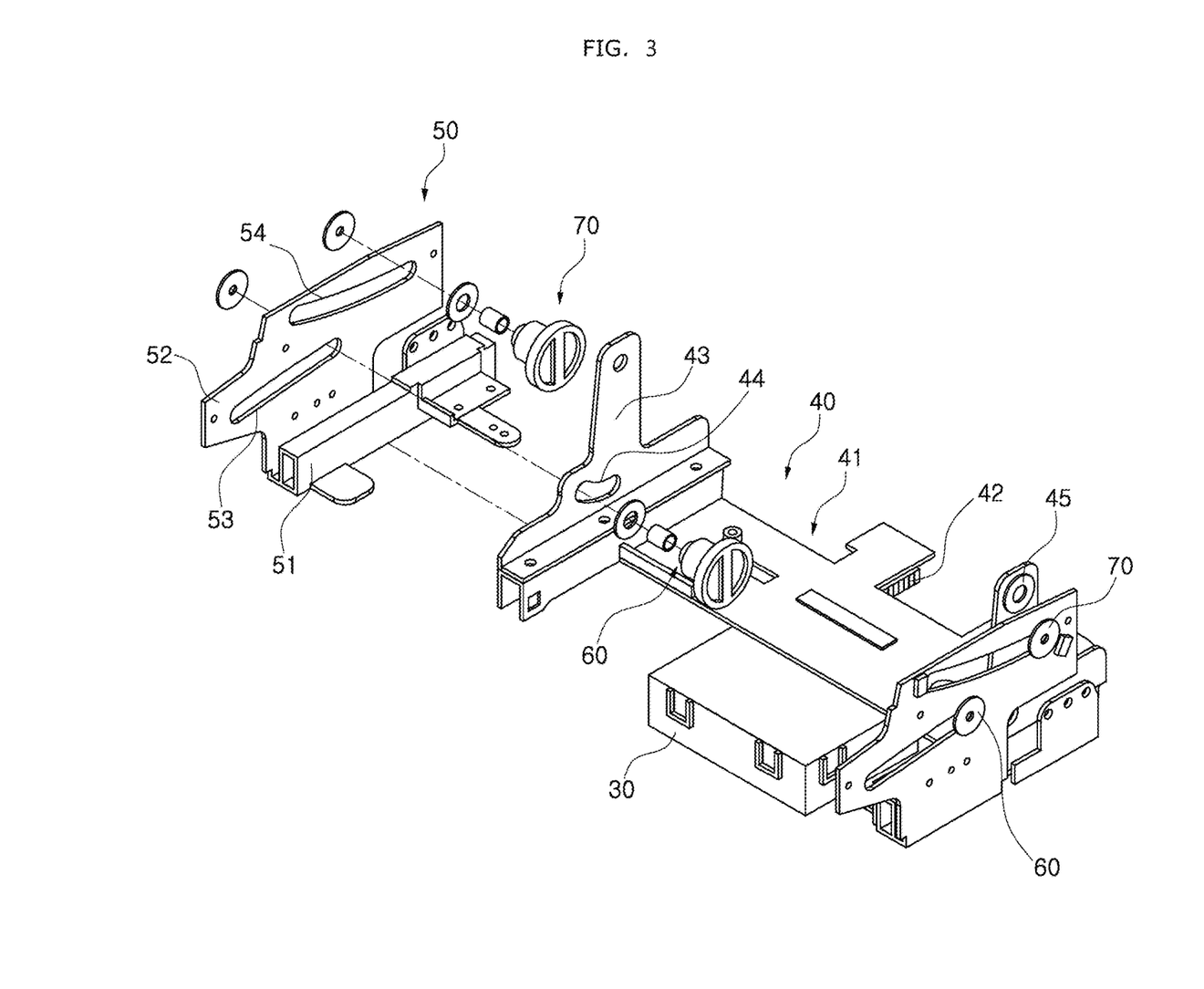
FIG. 3 is a perspective view illustrating a movable bracket unit and a fixed guide unit in accordance with the embodiment of the disclosure.
Figure 4:
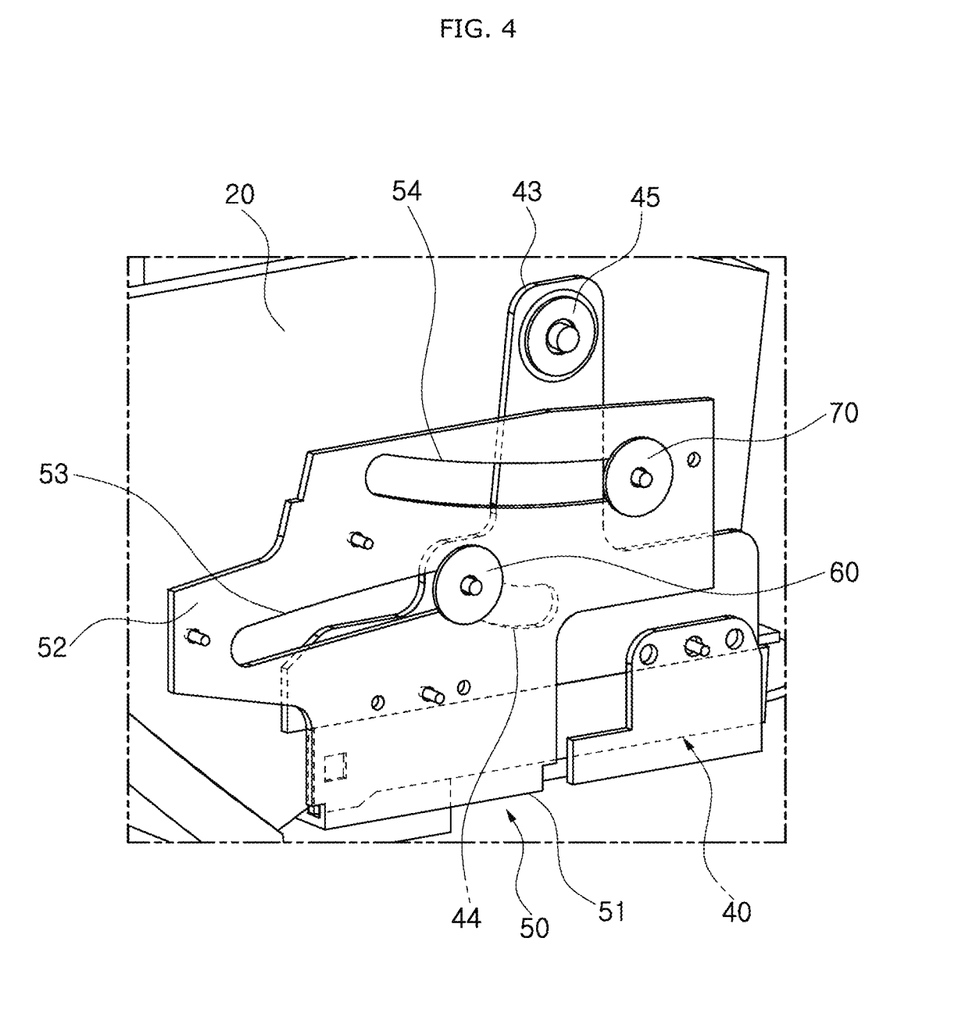
FIG. 4 is a perspective view illustrating a state in which a housing unit in accordance with the embodiment of the disclosure is in a closing mode.

FIG. 1 is a perspective view illustrating a glove box apparatus in accordance with an embodiment of the disclosure, FIG. 2 is an exploded perspective view illustrating the glove box apparatus in accordance with the embodiment of the disclosure, FIG. 3 is a perspective view illustrating a movable bracket unit and a fixed guide unit in accordance with the embodiment of the disclosure, and FIG. 4 is a perspective view illustrating a state in which a housing unit in accordance with the embodiment of the disclosure is in a closing mode.

As illustrated in FIGS. 1 to 4, a glove box apparatus 1 in accordance with an embodiment of the disclosure includes a fixed unit 10 which is fixed to a vehicle body, a housing unit 20 which is positioned inside the fixed unit 10 and is installed to be movable between an open mode in which a storage space 22 is open and a closing mode in which the storage space 22 is closed, a driving unit 30 which is installed on the fixed unit 10 and supplies power for moving the housing unit 20, a movable bracket unit 40 which is linearly moved by receiving the power of the driving unit 30 and on which the housing unit 20 is rotatably installed, a fixed guide unit 50 which is fixed to the fixed unit 10 facing the movable bracket unit 40 and in which a guide slot 53 is defined, and a movable connection unit 60 which is connected to the housing unit 20 by passing through the guide slot 53 of the fixed guide unit 50 and the movable bracket unit 40.

The fixed unit 10 is fixed to a dashboard positioned in front of a passenger seat, and guides the movement of the housing unit 20 which serves as a glove box. The fixed unit 10 in accordance with the embodiment of the disclosure includes a cover part 12 and a fixed base 14.

The fixed base 14 has a box shape which is open at the top and the front thereof, and is formed, on the side surface thereof, with a first hole 15 along which the movable connection unit 60 is moved and a second hole 16 along which a side connection unit 70 is moved. The cover part 12 is a structure which covers the top of the fixed base 14.

The housing unit 20 is positioned inside the fixed unit 10, and is installed to be movable between the open mode in which the storage space 22 is open and the closing mode in which the storage space 22 is closed. The housing unit 20 in accordance with the embodiment of the disclosure projects forward out of the fixed unit 10, and is rotated in such a way to be tilted downward.

The driving unit 30 is positioned below the housing unit 20, and is fixed to the fixed unit 10. As the driving unit 30, various kinds of driving devices may be used without departing from a technical idea of supplying power for moving the housing unit 20. As the driving unit 30 in accordance with the embodiment of the disclosure, an electric motor is used. As a gear provided on the output shaft of the electric motor is rotated while meshing with a rack gear 42 provided on the movable bracket unit 40, the linear movement of the movable bracket unit 40 is performed.

The rotational power of the driving unit 30 may be transferred to the movable bracket unit 40 through a link member, and other various modifications may also be implemented. Since a detailed configuration in which the movable bracket unit 40 is linearly moved by the power of the driving unit 30 is generally known in the art, detailed description thereof will be omitted herein.

The movable bracket unit 40 may be changed into various shapes without departing from a technical idea that the movable bracket unit 40 is linearly moved by receiving the power of the driving unit 30 and the housing unit 20 is rotatably installed on the movable bracket unit 40. The movable bracket unit 40 in accordance with the embodiment of the disclosure includes a movable base part 41, a side bracket 43, a guide hole 44, and a rotatable connection part 45.

The movable base part 41 is positioned under the housing unit 20, and includes the rack gear 42 which receives the power of the driving unit 30. The side bracket 43 is installed on each of both sides of the movable base part 41 which extends in the widthwise direction of the housing unit 20. The rack gear 42 which extends in the movement direction of the movable bracket unit 40 is disposed under the movable base part 41 which faces the driving unit 30.

Therefore, since the circular gear provided on the output shaft of the driving unit 30 is rotated while meshing with the rack gear 42, the movable base part 41 is linearly moved together with the rack gear 42.

The side bracket 43 extends upward at each of both the sides of the movable base part 41, and is installed at a position facing each side surface of the housing unit 20. The side bracket 43 has a plate shape, and the guide hole 44 is formed through the side bracket 43.

The guide hole 44 may be formed in various shapes without departing from a technical idea that an elongated aperture for allowing the movable connection unit 60 to be moved therealong is formed through the side bracket 43. The guide hole 44 is installed at a position facing the guide slot 53, and extends as an elongated hole in a direction different from the guide slot 53. The guide hole 44 in accordance with the embodiment of the disclosure forms an elongated hole with a curved shape.

A virtual line extending along the center of the guide hole 44 is referred to as a first center line C1, and a virtual line extending along the center of the guide slot 53 is referred to as a second center line C2. The first center line C1 and the second center line C2 are installed in shapes intersecting with each other. In accordance with the embodiment of the disclosure, the first center line C1 extends in the shape of a downwardly concaved curve, and the second center line C2 linearly extends in the same direction as the movement direction of the movable bracket unit 40.

In the case where the housing unit 20 performs only the translational movement by being linearly moved, the configuration of the guide hole 44 may be omitted.

The movable bracket unit 40 further includes the rotatable connection part 45 which rotatably connects the side bracket 43 and the housing unit 20. The rotatable connection part 45 has the shape of a pin which is connected to the housing unit 20 through a hole defined through an upper portion of the side bracket 43. Thus, the housing unit 20 may be rotated about the rotatable connection part 45.

The fixed guide unit 50 is fixed to the fixed unit 10 which faces the movable bracket unit 40, and may be formed in various shapes without departing from a technical idea that the guide slot 53 and a side slot 54 are formed through the fixed guide unit 50. The fixed guide unit 50 in accordance with the embodiment of the disclosure includes a mounting base part 51, a fixed bracket 52, the guide slot 53, and the side slot 54.

The mounting base part 51 is positioned between the housing unit 20 and the fixed unit 10, and is fixed to the fixed unit 10. The fixed bracket 52 which extends from the mounting base part 51 positioned on each of both lower sides of the housing unit 20 has a plate shape.

The fixed bracket 52 extends upward out of the mounting base part 51 to face the side bracket 43, and the guide slot 53 and the side slot 54 are formed through the fixed bracket 52. The fixed bracket 52 which has the plate shape is positioned inside the fixed base 14, and the first hole 15 communicates with the guide slot 53 and the second hole 16 communicates with the side slot 54.

The guide slot 53 may form a curved or straight groove, and other various modifications may also be implemented. The guide slot 53 in accordance with the embodiment of the disclosure may be determined as the curved or straight groove depending on a movement path of the housing unit 20. Also, the guide hole 44 which faces the guide slot 53 may also form a curved or straight groove, and may be determined as the curved or straight groove depending on the movement path of the housing unit 20.

The side slot 54 is formed through the fixed bracket 52. The side slot 54 forms an elongated aperture which extends in a direction different from the guide slot 53. The side slot 54 in accordance with the embodiment of the disclosure has the shape of a hole which extends in the shape of a downwardly concaved curve.

In order to control, by using the movable bracket unit 40 which performs only linear movement, the movement of the rotatable connection part 45 and the movable connection unit 60 which serve as hinge points of the housing unit 20, the guide hole 44 as a groove corresponding to an operation trajectory of the movable connection unit 60 is formed through the movable bracket unit 40.

The rotatable connection part 45 is linearly moved back and forth together with the side bracket 43, and the housing unit 20 may be rotated about the rotatable connection part 45. The movable connection unit 60 is moved in a linear direction along the guide slot 53, and is moved in a curved direction along the guide hole 44 by the rotation of the housing unit 20.

The movable connection unit 60 is connected to the housing unit 20 by passing through the guide slot 53 of the fixed guide unit 50 and the movable bracket unit 40, and is moved together with the housing unit 20. The movable connection unit 60 in accordance with the embodiment of the disclosure has a roller shape having one end which is fixed to the housing unit 20 and the other end which passes through the guide hole 44 and is rotatably installed through the guide slot 53.

The side connection unit 70 is connected to the housing unit 20 through the side slot 54, and is moved along the side slot 54 by the movement of the housing unit 20. The side connection unit 70 in accordance with the embodiment of the disclosure has a roller shape having one end which is fixed to the side surface of the housing unit 20 and the other end which is rotatably installed through the side slot 54.

Hereunder, operation states of the glove box apparatus 1 in accordance with the embodiment of the disclosure will be described in detail with reference to the attached drawings.

Figure 5:
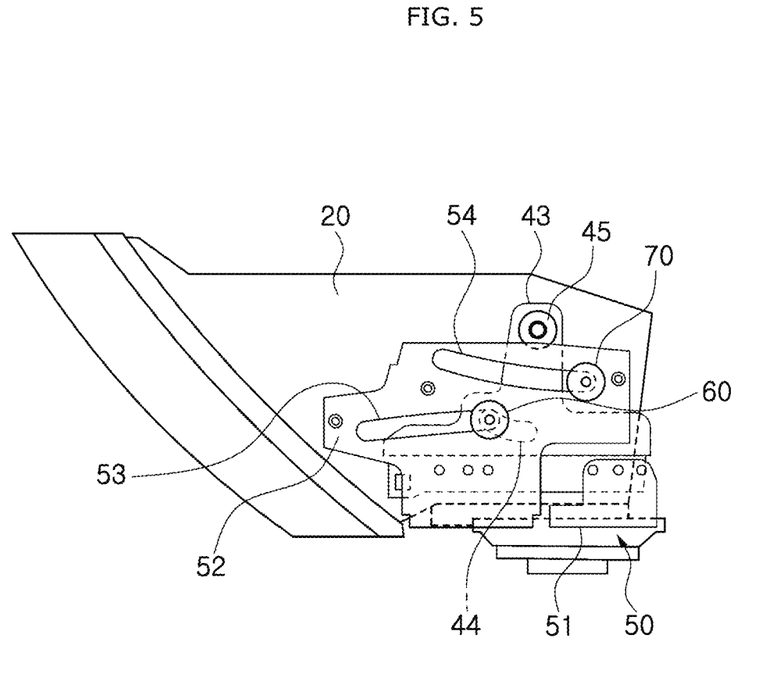
FIG. 5 is a front view illustrating the state in which the housing unit in accordance with the embodiment of the disclosure is in the closing mode.
Figure 6:
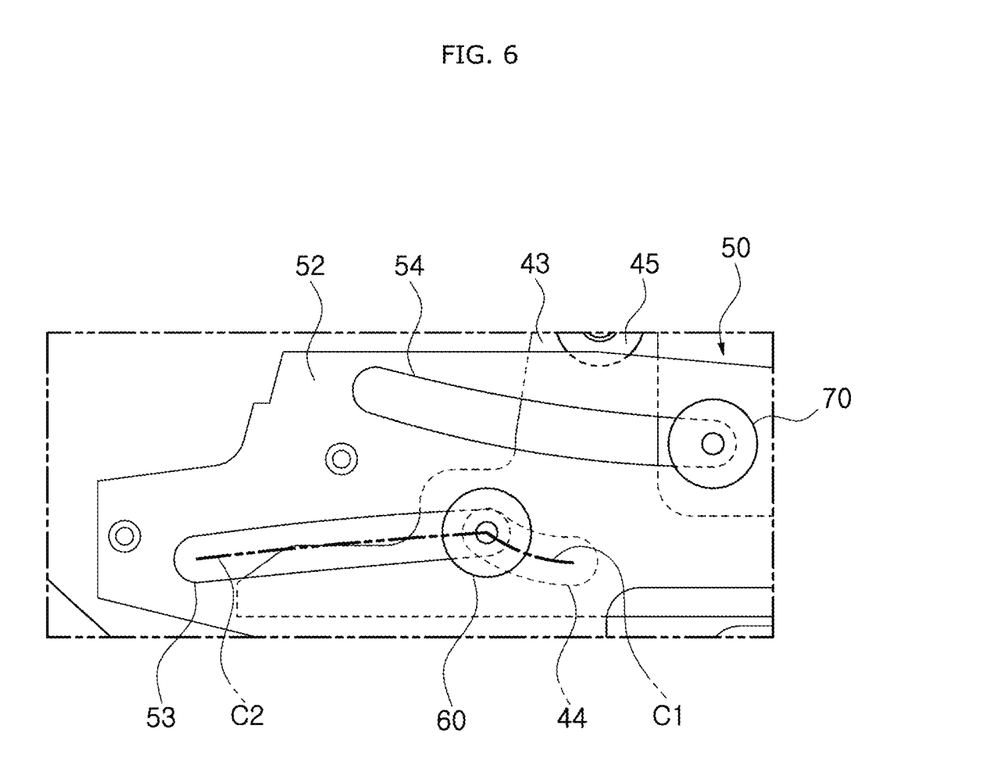
FIG. 6 is a front view illustrating a movable connection unit and a side connection unit in the state in which the housing unit in accordance with the embodiment of the disclosure is in the closing mode.
Figure 7:
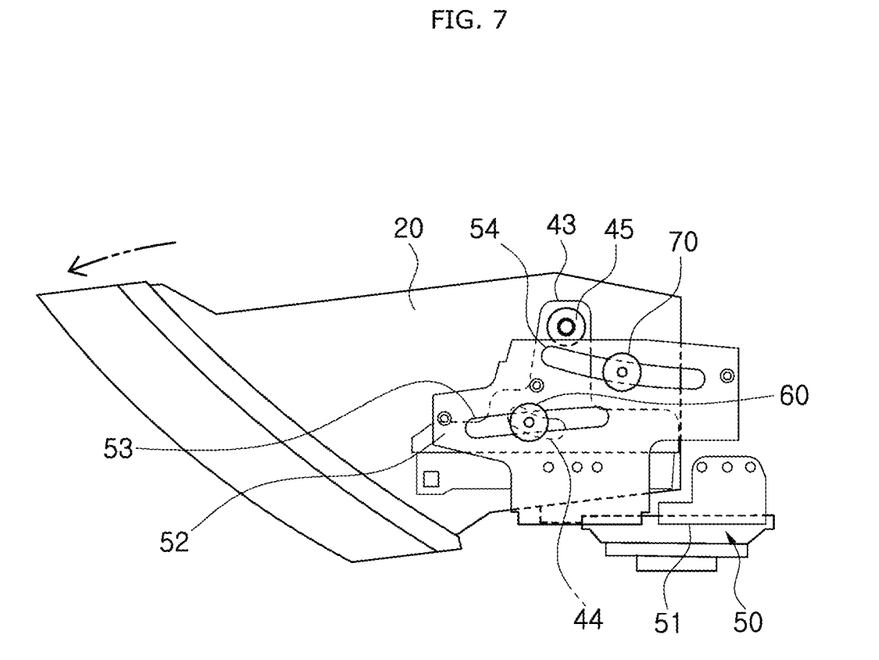
FIG. 7 is a front view illustrating a state in which the housing unit in accordance with the embodiment of the disclosure is moved forward.
Figure 8:
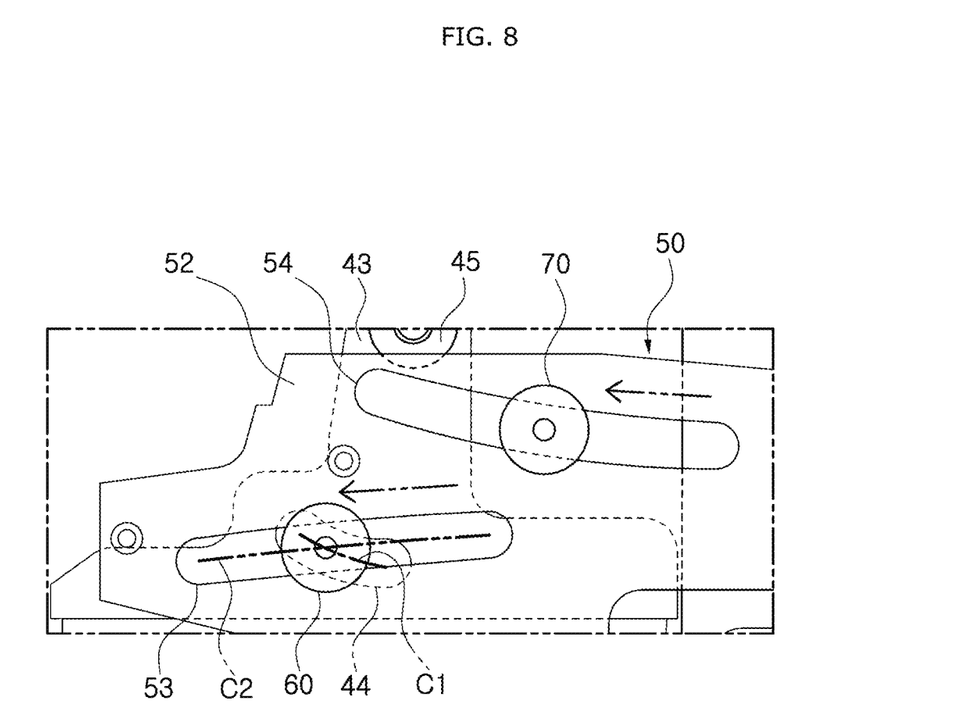
FIG. 8 is a front view illustrating a state in which the movable connection unit is moved along a guide slot while the housing unit in accordance with the embodiment of the disclosure is moved forward.
Figure 9:
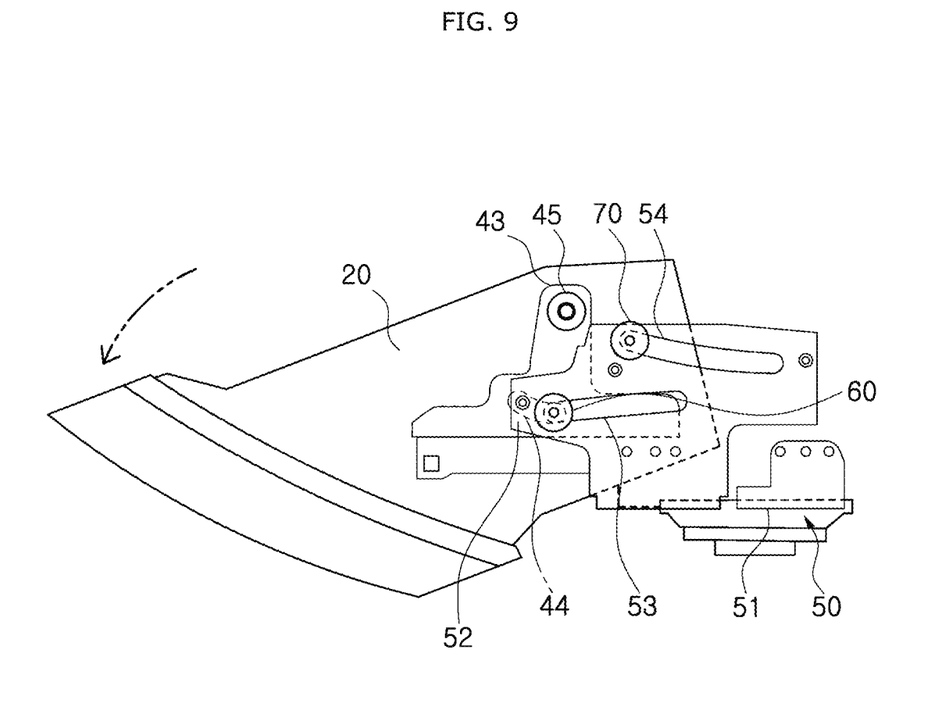
FIG. 9 is a front view illustrating a state in which the housing unit in accordance with the embodiment of the disclosure is in an open mode.
Figure 10:
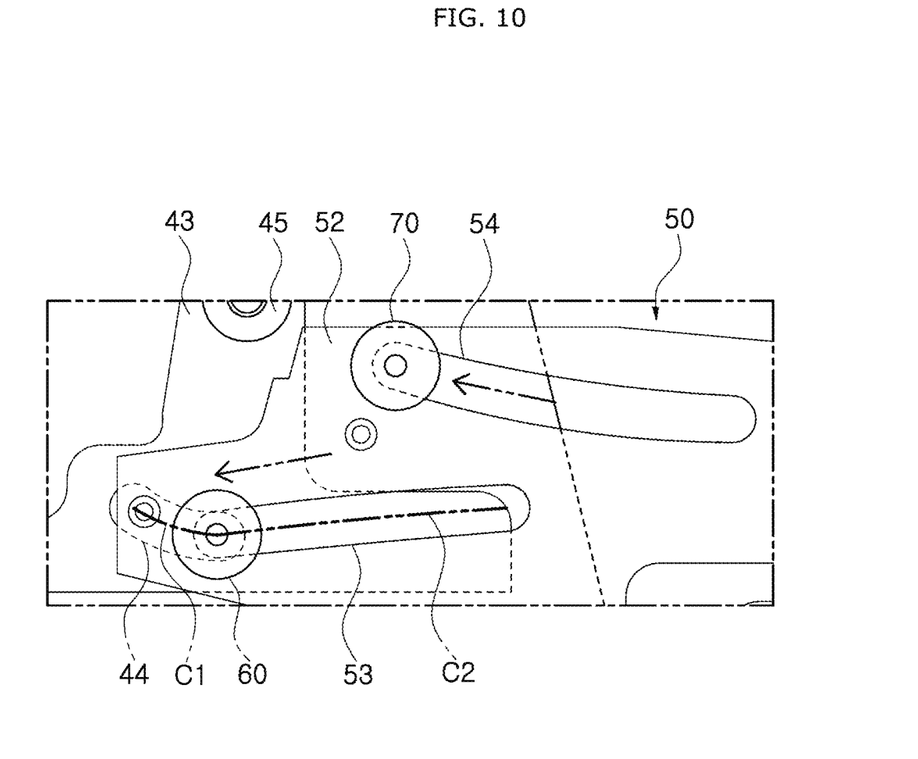
FIG. 10 is a front view illustrating the movable connection unit and the side connection unit in the state in which the housing unit in accordance with the embodiment of the disclosure is in the open mode.

FIG. 5 is a front view illustrating the state in which the housing unit in accordance with the embodiment of the disclosure is in the closing mode, FIG. 6 is a front view illustrating the movable connection unit and the side connection unit in the state in which the housing unit in accordance with the embodiment of the disclosure is in the closing mode, FIG. 7 is a front view illustrating a state in which the housing unit in accordance with the embodiment of the disclosure is moved forward, FIG. 8 is a front view illustrating a state in which the movable connection unit is moved along the guide slot while the housing unit in accordance with the embodiment of the disclosure is moved forward, FIG. 9 is a front view illustrating a state in which the housing unit in accordance with the embodiment of the disclosure is in the open mode, and FIG. 10 is a front view illustrating the movable connection unit and the side connection unit in the state in which the housing unit in accordance with the embodiment of the disclosure is in the open mode.

As illustrated in FIGS. 1 and 4 to 6, in the case where the housing unit 20 is in the closing mode, the side connection unit 70 is positioned in the other end (a right end in FIG. 5) of the side slot 54, and the movable connection unit 60 is also positioned in the other end of the guide slot 53.

As illustrated in FIGS. 3, 7 and 8, the rack gear 42 is linearly moved by the power of the driving unit 30, and the movable base part 41 which is connected to the rack gear 42 is also linearly moved. The housing unit 20 which is rotatably connected to the movable base part 41 through the rotatable connection part 45 is moved forward together with the movable base part 41.

The housing unit 20 is rotated in a downwardly tilted direction about the rotatable connection part 45 by its own weight. The movable connection unit 60 positioned in the upper end of the guide hole 44 is moved forward along the guide slot 53 and is moved toward the lower end of the guide hole 44. Such movement of the movable connection unit 60 is performed in liaison with the rotational movement of the housing unit 20.

Since the housing unit 20 is rotated downward as it is moved forward, the housing unit 20 is rotated about the rotatable connection part 45. The side connection unit 70 is moved forward along the side slot 54. Since the operation in which the movable connection unit 60 is moved from the upper end to the lower end of the guide hole 44 is performed together with the operation in which the movable connection unit 60 is moved to one end (a left end in FIG. 8) of the guide slot 53, the forward movement and the rotational movement of the housing unit 20 are simultaneously and easily performed.

As illustrated in FIGS. 9 and 10, in the case where the housing unit 20 is in the open mode, the movable connection unit 60 is positioned in the lower end of the guide hole 44 and at the same time is positioned in the one end (the left end in FIG. 10) of the guide slot 53.

The side connection unit 70 is also positioned in the upper end of the side slot 54 by being moved along the groove which has the downwardly concaved curve shape.

As is apparent from the above descriptions, according to the embodiment of the disclosure, as the movable connection unit 60 which is connected to the housing unit 20 is moved along the guide hole 44 and the guide slot 53, the translational movement and the rotational movement of the housing unit 20 are easily performed, which makes it possible to minimize a malfunction due to the deformation in each part. Also, according to the embodiment of the disclosure, since the housing unit 20 is configured to be rotated as well as translated toward a passenger when operating in the open mode, the storage space 22 of a glove box may be secured even when the glove box apparatus is applied to a slimmed dashboard.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A glove box apparatus comprising:
    a fixed unit fixed to a vehicle body;
    a housing unit positioned inside the fixed unit, and installed to be movable between an open mode in which a storage space is open and a closing mode in which the storage space is closed;
    a driving unit installed on the fixed unit, and configured to supply power for moving the housing unit;
    a movable bracket unit linearly moved by receiving the power of the driving unit, and having the housing unit rotatably installed thereon;
    a fixed guide unit fixed to the fixed unit which faces the movable bracket unit, and defined with a guide slot; and
    a movable connection unit connected to the housing unit by passing through the guide slot of the fixed guide unit and the movable bracket unit.

2. The glove box apparatus according to claim 1, wherein the movable bracket unit comprises:
    a movable base part fixed to a lower side of the housing unit, and having a rack gear which receives the power of the driving unit;
    a side bracket extending upward from each of both sides of the movable base part; and
    a guide hole formed through the side bracket to define an aperture for allowing the movable connection unit to be moved therethrough.

3. The glove box apparatus according to claim 2, wherein the movable bracket unit further comprises:
    a rotatable connection part configured to rotatably connect the side bracket and the housing unit.

4. The glove box apparatus according to claim 2, wherein the guide hole is installed at a position facing the guide slot, and extends as an elongated hole in a direction different from the guide slot.

5. The glove box apparatus according to claim 4, wherein the guide hole forms an elongated hole with a curved shape.

6. The glove box apparatus according to claim 4, wherein the fixed guide unit comprises:
    a mounting base part fixed to the fixed unit; and
    a fixed bracket extending upward out of the mounting base part to face the side bracket, and having the guide slot formed therethrough.

7. The glove box apparatus according to claim 6, wherein the fixed guide unit further comprises:
    a side slot formed through the fixed bracket, and defining an elongated aperture which extends in a direction different from the guide slot.

8. The glove box apparatus according to claim 7, further comprising:
    a side connection unit connected to the housing unit by passing through the side slot, and moved along the side slot by movement of the housing unit.

9. The glove box apparatus according to claim 7, wherein the side slot has a shape of a hole which extends in a shape of a downwardly concaved curve.

* * * * *